Dec. 4, 1928.
A. J. MICHELIN
1,693,909
RIM FOR PNEUMATIC TIRES
Filed Oct. 20, 1927    2 Sheets-Sheet 1
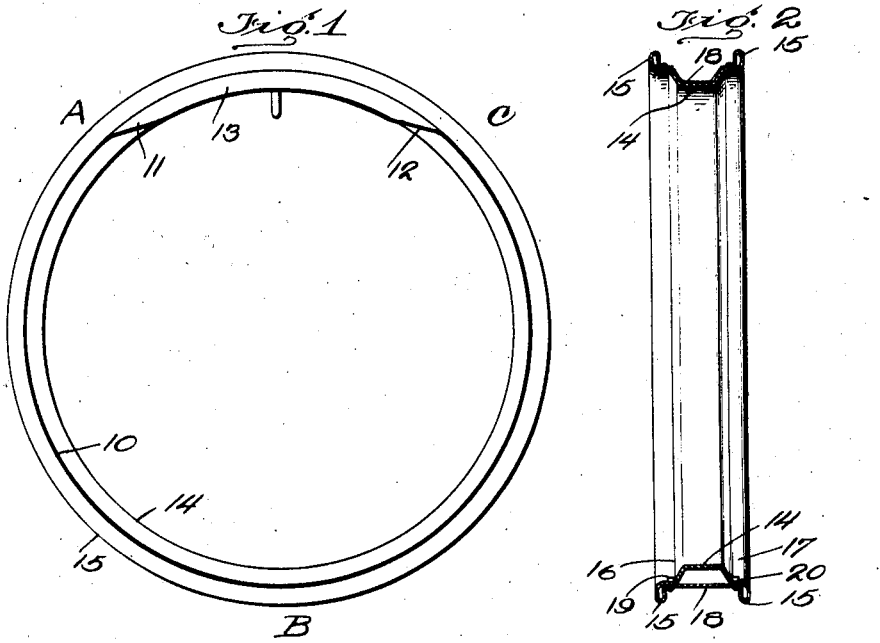
INVENTOR.
A. J. Michelin
BY
Wilkinson & Giusta
ATTORNEYS.

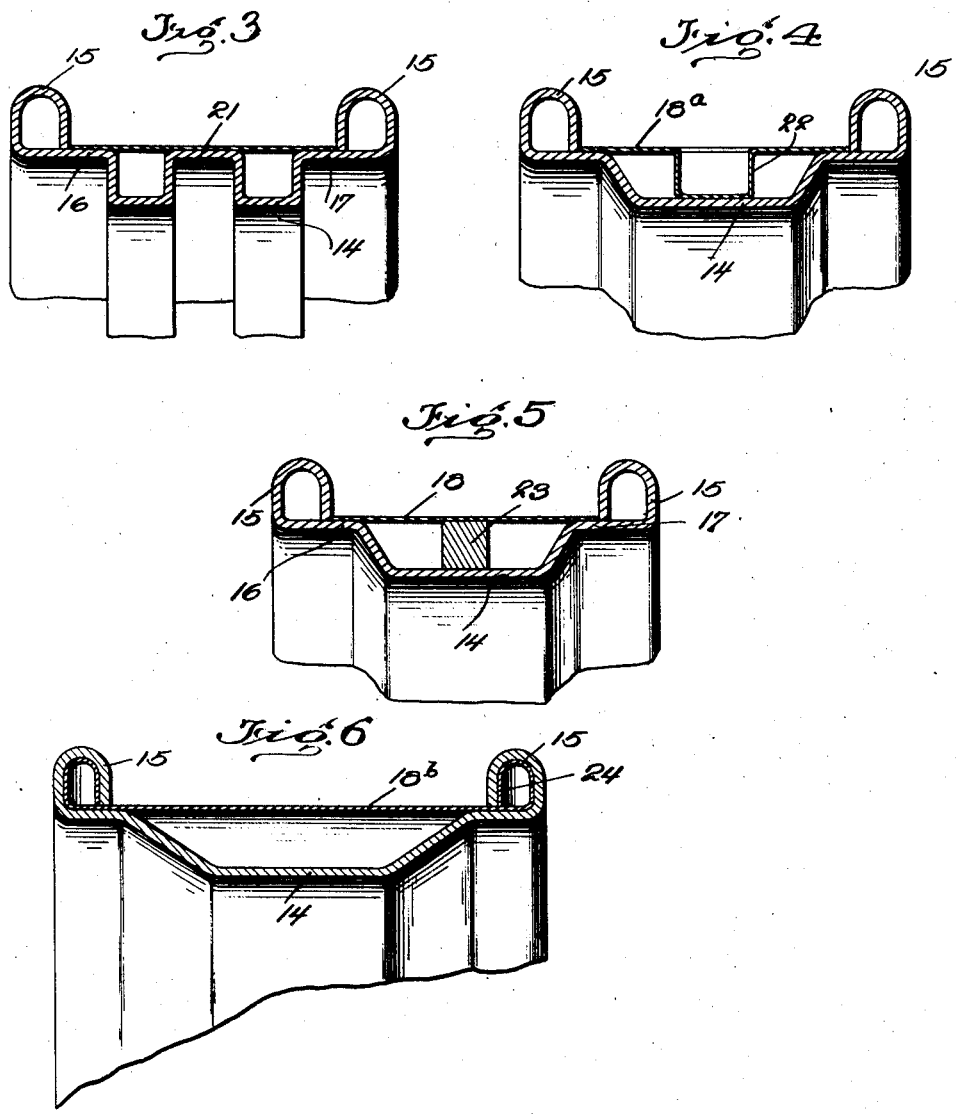

Patented Dec. 4, 1928.

1,693,909

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

RIM FOR PNEUMATIC TIRES.

Application filed October 20, 1927, Serial No. 227,575, and in France November 27, 1926.

The present invention relates to improvements in rims for pneumatic tires and has for an object to provide an inexpensively and easily constructed vehicle rim of the type in which a deep trough or channel is formed in one circumferential section of the rim.

The purpose of the deep channel at one portion of the rim is to permit the beads of the casing or shoe to enter this depressed channel or trough so that the beads at the diametrically opposite portion may clear the flanges of the rim in the act of applying or demounting the tire.

The invention also aims to provide means whereby a rim of an ordinary deep channel construction may be converted into a rim having a partial deep channel or trough.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a diagrammatic view showing a type of rim having a deep channel or trough at one circumferential portion.

Figure 2 is a cross section of the device shown in Figure 1.

Figures 3, 4, 5 and 6 are fragmentary cross sections on an enlarged scale taken through further modified forms of the invention.

In accordance with the invention, instead of making a rim with a bottom 10 having the particular shape represented by the heavy line in Figure 1, the base of which is provided with the downwardly sloping portions 11 and 12 leading to the depressed trough or channel 13 at one circumferential section, I propose to manufacture in the first instance a rim having throughout its entire circumference a depressed channel or base 14. The flanges of the rim are indicated at 15.

The depressed base 14, as shown in Figure 2, is provided with the shoulders 16 and 17, upon which the beads of the casing or shoe are adapted to rest. Upon these shoulders 16 and 17 is placed a bridging or filler plate 18 of metal or other appropriate material in the form of a band. This plate 18 bridges the channel and substantially closes the channel at the level of the seats 16 and 17. The plate 18 is, however, depressed at the parts 11 and 12 in Figure 1 so that the upper portion, as shown in Figure 2, is depressed into the deep channel 13. This strip or plate 18 is affixed to the rim by any appropriated means, for instance, by riveting, welding, or the like. In Figure 2, rivets, bolts or any fastenings are indicated at 19 and 20 as passing through the rim shoulders and filler plate 18.

In the regions A, B, and C in Figure 1, support may be interposed between the strip 18 and rim bottom 14 for sustaining the strip 18. In Figure 3, the base of the rim 14 is shown as made with a central circumferential boss 21 extending outwardly in line with the shoulders 16 and 17 and for supporting the plate 18 centrally.

In Figure 4, a downwardly depressed circumferential portion or projection 22 is shown as made in the strip 18ª. This boss 22 rests at its inner portion upon the depressed base portion of the rim 14 and serves to support the intermediate portions of the plate.

In Figure 5, a block 23 of separate manufacture from the rim and from the plate 18, is shown as interposed between the rim base 14 and the plate 18. This block 23 may be welded or otherwise secured against lateral movement.

In Figure 6, the filler plate 18ᵇ is provided with projecting edge portions which extend into the hollow rolled rim flanges 15 and these edges 24 are rolled upwardly, backwardly and downwardly upon the filler plate within the hollow flanges 15 and conform in general to the shape of the flanges.

It will be obvious that many changes in the construction, combination and arrangement of parts could be made, which could be used without departing from the spirit of my invention, and I do not mean to limit the invention to such details, except as particularly pointed out in the claim.

Having thus described my invention, what I claim and desire to secure by Letters Patent of the United States is:—

A deep rim structure for wheels using pneumatic tires, comprising an annular trough shaped band provided with lateral flanges, a central deep groove located between and parallel to said flanges, and annular cylindrical shoulders at each side of said groove and between it and said flanges, with an annular metal strip having its edges resting on and supported on said shoulders and forming a cylindrical bridge for said groove throughout the major portion of its length circumferentially, said bridge having a smooth cylindrical outer face, a portion of said strip at the ends of said bridge being pressed down into said groove, with means interposed between the bridge portion of said strip and the bottom of said groove for bracing said strip against compression inwards when the wheel, with an inflated tire thereon, is in use on the road.

ANDRÉ JULES MICHELIN.